United States Patent Office 3,817,835
Patented June 18, 1974

3,817,835
PROCESS FOR THE PRODUCTION OF
ANTIMICROBIAL AGENTS
Saul Lewis Neidleman, Lawrence Township, N.J., assignor to E. R. Squibb & Sons, Inc., Princeton, N.J.
No Drawing. Continuation-in-part of abandoned application Ser. No. 810,782, Mar. 26, 1969. This application Sept. 8, 1971, Ser. No. 178,797
Int. Cl. C12d 9/00, 9/06, 9/14
U.S. Cl. 195—80 R            8 Claims

ABSTRACT OF THE DISCLOSURE

This invention relates to a method for the production of antimicrobial agents in crude filtrates, whole broths or cell extracts of microorganisms, which comprises treating these with a source of positive halogen, such as an N-haloamide, N-haloimide or a halogenating enzyme.

---

This application is a continuation-in-part of copending application Ser. No. 810,782, filed Mar. 26, 1969, now abandoned.

The elaboration of active antimicrobial metabolites by microorganisms, e.g., the production of antibiotics by fermentation, is well known. Similarly, many microorganisms produce metabolites under similar conditions which are essentially inactive, that is have little or no antimicrobial activity. These metabolites and fermentation broths, crude filtrates and cell extracts containing inactive metabolites are essentially useless in combating pathogenic microorganisms and would be discarded for this purpose. Accordingly, a system for converting these essentially useless materials into active antimicrobial agents would be most desirable.

It is known in the prior art to convert certain pure intermediates to active antibiotics by reacting the pure intermediates with certain halogenating sources. Thus, for example, U.S. Pat. No. 3,431,303 discloses the treating of 1,3,4,10,11,12-hexahydroxy-6-methyl-naphthacene - 2-carboxamide (a pure compound) with a 7-halogenating strain of the genus Streptomyces to form an active antibiotic. U.S. Pat. No. 3,530,146 discloses straight chemical halogenations of pure materials such as thiophenol acetate. U.S. Pat. No. 3,338,963 discloses the preparation of tetracycline compounds by reacting aminotetracyclines with a halogenating agent to convert them to haloaminodeoxytetracyclines.

In each of the above-mentioned references, straight chemical halogenation reactions of pure materials are carried out to form active antibiotics. These patents neither deal with nor resolve the problem of salvaging essentially useless and unwanted antimicrobially-inactive crude fermentation broths, crude filtrates and cell extracts by converting these crude materials into antimicrobially active materials.

In accordance with the present invention, it has been found that whole broths, crude filtrates or cell extracts of microorganisms which have been produced by culturing microorganisms and which contain metabolic products having little or no intrinsic growth inhibitory activity against pathogenic microorganisms, may be upgraded or converted to products, that is active antimicrobial agents, having appreciable antimicrobial activity, by treating the whole fermentation broth, crude filtrate obtained therefrom or cell extract of said microorganism with a source of positive halogen and separating a product having appreciable antimicrobial activity. The product separated from the reaction mixture is substantially free of positive halogen source or other starting materials.

In the above method, if desired, whole fermentation broths, crude filtrates and cell extracts can be employed, as is, without removing unwanted fermentation products therefrom. Furthermore, if desired fermentation broths, filtrates and cell extacts from which active materials have been removed leaving unwanted and inactive residues can be employed as starting materials in the method of the invention. Thus, in essence, the above method effects the reclaiming of apparently useless fermentation broths, filtrates of extracts by converting these into desirable and useful antimicrobial agents.

By the term "little or no intrinsic growth-inhibitory activity against pathogenic microorganisms" or "little or no antimicrobial activity" is meant that the minimum inhibitory concentration of the metabolites present in the fermentation broth, filtrate or cell extract is greater than 50 microcentigrams per milliliter.

By the term "appreciable antimicrobial activity" as employed herein is meant that the minimum inhibitory concentration of the halogenated metabolic reaction products is less than or equal to 50 microcentigrams per milliliter.

The crude reaction mixtures namely the crude broth, crude filtrate or cell extract containing metabolic reaction products which have little or no intrinsic growth-inhibitory activity against pathogenic microorganisms are obtained by culturing any of a variety of species of microorganisms according to conventional fermentation techniques, e.g., culturing the microorganism at temperatures ranging from about 5 to about 60° C. and preferably from about 20 to about 50° C. under submerged aerobic conditions in an aqueous nutrient medium containing an assimilable carbohydrate and nitrogen source for about 2 to 5 days.

Microorganisms of a wide variety of genera may be subjected to such fermentation procedures, especially those of the families Xylariaceae, Moniliaceae, Sphaerioidaceae, Dematiaceae, Gnomoniaceae, Hypocreaceae, Sphaeriaceae, Polyporaceae, Melanconeaceae, Tremellaceae, Pipetocephalidaceae. Tuberculariaceae. Saccharomycetaceae, Mucoraceae, Agaricaoeae, Entomophthoraceae, Stilbaceae, Sphaeropsidaceae, Dematiaceae, Hypocreaceae, Thamnidiaceae and the like, incluring genera such as Streptomyces, Penicillium, Gonaderma, Omphalia, Xylaria, Piricauda, Helicoma, Aspergillus, Syncephalostrum, Myrothecium, Botrytris, Cercosporella, Glomerella, Gnomonia, Didymella, Diploida, Trichothecium, Daldinia, Eidamia, Gibberella, Curvularia, Polyporus, Agaricus, Corticium, Pizizella, Fomes, Trameles, Actinopycnidium, Absidia.

Illustrative species of the foregoing include Streptomyces chartreusis, Streptomyces viridochromogenus, Streptomyces coerulescens, Streptomyces coeruleorubidis, Streptomyces roseochromogenes, Streptomyces cyaneus, Streptomyces parvullus, Penicillium waksmanii, Stilbella fimetaria, Coniotherium ulmenum, Didymella lycopersici, Botrytis allii, Aspergillus clavatus, Gliocladium fimbriatum, Cercosporella acetosellae, Daldinia concentrica.

Microorganisms such as the foregoing may be obtained from known sources by conventional techniques, from the various microorganism depositories or from natural sources, e.g., by isolation from a soil sample, plating on an agar medium and growth in a germination medium.

The fermentation procedure to obtain metabolic elaboration products from the microorganism is carried out in a conventional manner, following substantially the same procedure as in the production of antimicrobially active antibiotics such as streptomycin, chlortetracycline, oxytetracycline and many others. Thus, the microorganism is grown in contact with (in or on) a suitable nutrient medium in the presence of an adequate supply of oxygen (air). A suitable nutrient medium essentially comprises a source of nitrogenous factors and an assimilable source of carbon and energy. The latter may be a carbohydrate, such as sucrose, molasses, glucose, maltose, starch or dextrin. The source of nitrogenous factors may be organic (e.g., soybean meal, corn steep liquor, meat extract, distillers solubles, peptones and/or yeast extract) or synthetic (i.e., composed of simple, synthesizable organic and inorganic compounds such as ammonium salts, alkali nitrates, amino acids or urea). A sample taken from the fermentation broth or crude filtrate, showing little or no intrinsic growth inhibitory activity against pathogenic microorganisms, may be converted to active material by the method of this invention.

The whole crude fermentation broth obtained in the above manner may be treated with a source of positive halogen, the reaction mixture may be filtered to remove the mycelial growth and other solids and this crude filtrate treated with a source of halogen, or the source of halogen may be applied to an extract taken from the reaction mixture utilizing an organic solvent such as n-butanol, ethyl acetate, ether, ethanol, methanol, dimethylsulfoxide, chloroform or the like, or combinations of such solvents. Alternatively, the organic solvent may be removed by evaporation, for example, and the solids obtained are redissolved in an aqueous medium for treatment with a source of halogen.

Sources of halogen or halogenation agents which may be used according to this invention include N-haloamides, e.g., N-halo(lower alkanoic acid amides) such as N-bromoacetamide, N-chloroacetamide, N-haloimides, e.g., N-halo(lower alkanedioic acid imides) such as N-bromosuccinimide, N - chlorosuccinimide, N-iodosuccinimide, or a halogenating enzyme such as chloroperoxidase obtained from *Caldariomyces fumago*. The organism can be grown as a static culture of Czapek-Dox Medium for 7–20 days. The enzyme is prepared as a water extract of an acetone powder of the microorganism. In addition to the enzyme, hydrogen peroxide and potassium bromide are required in the reaction medium. Best results are obtained with N-bromosuccinimide, N-bromoacetamide and choroperoxidase, which are preferred, especially the first two.

The halogenating agent or agents are added to the whole broth, crude filtrate or cell extract at levels of about 0.1 to 50 mg. of halogenating agent per ml. of fermentation product, preferably about 1 to 5 mg./ml. and the mixture is maintained at a temperature in the range of about 20° to 40° C., preferably at ambient temperature. The mixture is permitted to react for a period of time of the order of about 1 to 60 minutes with or without stirring. Usually stirring at room temperature, e.g., about 25° C., for about 15 minutes is sufficient.

The reaction mixture is then extracted with an organic solvent such as n-butanol, ethyl acetate, chloroform, methylisobutylketone, n-hexane or the like, or a mixture of such organic solvents to remove substantially all starting materials therefrom. The reaction mixture on the solvent extract is tested for antimicrobial activity, e.g., by the agar diffusion disc assay procedure as described by Meyers et al. in *Combined Action of Vernamycin A and Other Antibiotics; Antimicrobial Agents and Chemotherapy*—1965, American Society for Microbiology or by the application of the bioautographic technique as described in J. Chromatog., 26 (1967) 531–532, using for example, *Staphylococcus aureus, Pseudomonas aeruginosa, Escherichia coli* or *Candida albicans* as the test organisms. Purified halogenated materials from the solvent extract may be tested in a routine two-fold tube dilution assay against a variety of organisms including the above four species as well as *Trichomonas vaginalis, Salmonella schottmuelleri, Proteus vulgaris, Trichophyton mentagrophytes, Mycobacterium tuberculosis* (BCG) and *Pasteurella multocida*.

Thus, for example, broths obtained from *Streptomyces cyaneus, Streptomyces viridochromogenes* or *Streptomyces chartreusis* when treated with N-bromosuccinimide yield substances inhibitory towards *S. aureus, E. coli,* and *C. albicans*. Broths obtained from *Stilbella fimetaria, Streptomyces coerulescens* or *Streptomyces coeruleorubidis* and treated with the same agent inhibit *C. albicans*.

Untreated broths from the same sources do not show such inhibitory action.

The antimicrobial material in the extract may be isolated by usual procedures of chromatography and elution employing cellulose derivatives, alumina, silica gel or the like.

The chemically halogenated microbial metabolites obtained by the method of this invention are antimicrobial agents useful in combatting bacterial or fungal infections and may be utilized in the same manner as tetracycline or amphotericin B, for example. They may be used against a variety of infection causing microorganisms in various mammalian species, e.g., *Staphylococcus aureus, Escherichia coli, Candida albicans, Salmonella schottmuelleri, Pseudomonas aeruginosa, Proteus vulgaris, Trichophyton mentagrophytes, Trichomonas vaginalis, Mycobacterium tuberculosis* (BCG) and *Pasteurella multocida*.

For example, they may be administered orally to various animal species, e.g., mice in an amount of about 5 to 25 mg./kg./day, preferably in 2 to 4 divided doses, in any of the conventional oral dosage forms, or topically in creams in equivalent amounts. They may be used as surface disinfectants. About 0.01 to 1.0% by weight of any of these substances may be dispersed on an inert solid or in a liquid such as water and applied as a dust or spray or incorporated in a soap or other cleansing agent such as a solid or liquid detergent composition. The latter may be used, for example, in general cleaning, in cleaning dairy barns or dairy, food handling or food processing equipment.

The following examples are illustrative of the invention. All temperatures are expressed on the centigrade scale.

EXAMPLE 1

A culture of *Stilbella fimetaria* (CBS) is grown in approximately 50 ml. of an aqueous medium containing, per 1000 ml., 30 grams extraction process soybean meal, 50 grams glucose, and 7 grams calcium carbonate, in a 250 ml. Erlenmeyer flask. The flask is agitated on a rotary shaker (280 cycles per minute) at 25° C. for a period of four days. The broth is then adjusted to pH 3 with 6 N HCl and centrifuged. To 5 ml. of the acidified supernatant is added 12.5 mg. of N-bromosuccinimide. The reaction mixture is rotated on a Vortex mixer and allowed to stand for 15 minutes at room temperature. The preparation is then extracted with 1 ml. n-butanol. A 5 ml. aliquot of acidified supernatant without added N-bromosuccinimide is likewise extracted with 1 ml. n-butanol as an untreated control. Five ml. aliquots of unfermented medium are similarly prepared: one is reacted with N-bromosuccinicide, one is not reacted. The four n-butanol extracts are then tested for antimicrobial activity by the routine agar diffusion disc assay procedure by incubation on plates containing agar each seeded with one of each of the following test organisms: *Staphylococcus aureus* 209P, *Escherichia coli, Pseudomonas aeruginosa* and *Candida albicans*. The extract of N-bromosuccinimide treated, acidified supernatant of the fermentation shows inhibition of the growth of *Candida albicans*, whereas the extracts of untreated, acidified supernatant of the fermentation and the treated and untreated acidified supernatants of the unfermented medium show no growth inhibitory activity against any of the three test organisms. Purified material shows significant inhibitory activity in a 2-fold tube dilution assay against *Eschericha coli, Salmonella schottmuelleri, Trichophyton mentagrophytes, Mycobacterium tuberculosis* (BCG), *Pasteurella multocida*.

EXAMPLE 2

The procedure of Example 1 is followed substituting *Streptomyces cyaneus* (ATCC 21378) for *Stilbella fimetaria*. The extract of the N-bromosuccinimide treated, acidified supernatant of the fermentation shows inhibition of the growth of *Staphylococcus aureus* 209P, *Escherichia coli, Candida albicans,* whereas the extracts of the untreated, acidified supernatant of the organism, and the treated and untreated acidified supernatants of the unfermented medium showed no growth inhibitory activity against any of the three test organisms.

EXAMPLE 3

The procedure of Example 1 is followed substituting *Didymella lycopersici* (CBS) for *Stilbella fimetaria*. Only the extract of N-bromosuccinimide treated, acidified supernatant of the fermentation shows inhibition of the growth of *Staphylococcus aureus* 209P.

EXAMPLE 4

The procedure of Example 1 is followed substituting *Botrytis allii* (ATCC 9435) for *Stilbella fimetaria*. Only the extract of N-bromosuccinimide treated, acidified supernatant of the fermentation shows inhibition of the growth of *Staphylococcus aureus* 209P.

EXAMPLE 5

The procedure of Example 1 is followed substituting *Streptomyces roseochromogenes* for *Stilbella fimetaria*. Only the extract of N-bromosuccinimide treated, acidified supernatant of the fermentation shows inhibition of the growth of *Staphylococcus aureus* 209P, *Escherichia coli,* and *Candida albicans.*

EXAMPLE 6

The procedure of Example 1 is followed substituting *Aspergillus clavatus* (ATCC 20198) for *Stilbella fimetaria*. Only the extract of N-bromosuccinimide treated, acidified supernatant of the fermentation shows inhibition of the growth of *Staphylococcus aureus* 209P, *Escherichia coli* and *Candida albicans.*

EXAMPLE 7

The procedure of Example 1 is followed substituting *Aspergillus penicilloides* (ATCC 20199) for *Stilbella fimetaria*. Only the extract of N-bromosuccinimide treated, acidified supernatant of the fermentation shows inhibition of the growth of *Staphylococcus aureus* 209P.

EXAMPLE 8

The procedure of Example 1 is followed substituting *Coniotherium ulmenum* (CBS) for *Stilbella fimetaria*. Only the extract of N-bromosuccinimide treated, acidified supernatant of the fermentation shows inhibition of the growth of *Candida albicans.*

EXAMPLE 9

The procedure of Example 1 is followed substituting *Coniotherium olivaceum* (CBS) for *Stilbella fimetaria*. Only the extract of N-bromosuccinimide treated, acidified supernatant of the fermentation shows inhibition of the growth of *Staphylococcus aureus* 209P.

EXAMPLE 10

The procedure of Example 1 is followed substituting *Coniotherium olivaceum* (CBS) for *Stilbella fimetaria*. Only the extract of N-bromosuccinimide treated, acidified supernatant of the fermentation shows inhibition of the growth of *Staphylococcus aureus* 209P and *Candida albicans.*

EXAMPLE 11

The procedure of Example 1 is followed substituting *Coniotherium rosarum* (CBS) for *Stilbella fimetaria*. Only the extract of the N-bromosuccinimide treated, acidified supernatant of the fermentation shows inhibition of the growth of *Candida albicans.*

EXAMPLE 12

The procedure of Example 1 is followed substituting *Coniotherium minitans* (Imperial Mycological Inst., England) *Stilbella fimetaria*. Only the extract of the N-bromosuccinimide treated, acidified supernatant of the fermentation shows inhibition of the growth of *Candida albicans.*

EXAMPLE 13

The procedure of Example 1 is followed substituting *Coniotherium pityophilum* (CBS) for *Stilbella fimetaria*. Only the extract of the N-bromosuccinimide treated, acidified supernatant of the fermentation shows inhibition of the growth of *Candida albicans.*

EXAMPLE 14

The procedure of Example 1 is followed substituting *Streptomyces coerulescens* (ATCC 19896) for *Stilbella fimetaria*. Only the extract of the N-bromosuccinimide treated, acidified supernatant of the fermentation shows inhibition of the growth of *Candida albicans* by the agar diffusion disc assay. Purified extract shows significant inhibitory activity in the two-fold tube dilution assay against *Salmonella schottmuelleri, Escherichia coli, Trichophyton mentagrophytes, Mycobacterium tuberculosis* (BCG), *Pasteurella multocida* and *Candida albicans.*

EXAMPLE 15

The procedure of Example 1 is followed by substituting *Streptomyces parvullus* (ATCC 12434) for *Stilbella fimetaria*. Only the extract of the N-bromosuccinimide treated, acidified supernatant of the fermentation shows inhibition of the growth of *Staphylococccus aureus* 209P.

EXAMPLE 16

The procedure of Example 1 is followed substituting *Gliodadium fimbriatum* (ATCC 10098) for *Stilbella fimetaria*. Only the extract of the N-bromosuccinimide treated, acidified supernatant of the fermentation shows inhibition of the growth of *Staphylococcus aureus.*

EXAMPLE 17

The procedure of Example 1 is followed substituting *Streptomyces diastaticus* (NRRL 2650) for *Stilbella fimetaria*. Only the extract of the N-bromosuccinimide treated, acidified supernatant of the fermentation shows inhibition of the growth of *Staphylococcus aureus.*

EXAMPLE 18

The procedure of Example 1 is followed substituting *Streptomyces hawaiiensis* (ATCC 12236) for *Stilbella fimetaria*. Only the extract of the N-bromosuccinimide treated, acidified supernatant of the fermentation shows inhibition of the growth of *Candida albicans.*

EXAMPLE 19

The procedure of Example 1 is followed substituting *Streptomyces albus* (NRRL B-71685) for *Stilbella fimetaria*. Only the extract of the N-bromosuccinimide, treated, acidified supernatant of the fermentation shows inhibition of the growth of *Staphylococcus aureus* 209P.

EXAMPLE 20

The procedure of Example 1 is followed substituting *Streptomyces coeruleorubidis* (ATCC 13740) for *Stilbella fimetaria*. Only the extract of the N-bromosuccinimide treated, acidified supernatant of the fermentation shows inhibition of the growth of *Candida albicans* by the agar diffusion disc assay. Purified extract shows significant inhibitory activity in the two-fold tube dilution assay against *Salmonella schottmuelleri, Escherichia coli, Trichophyton mentagrophytes, Mycobacterium tuberculosis* (BCG), *Pasteurella multocida* and *Candida albicans.*

EXAMPLE 21

The procedure of Example 1 is followed substituting *Streptomyces viridochromogenes* (NRRL B-1511) for *Stilbella fimetaria*. Only the extract of the N-bromosuccinimide treated, acidified supernatant of the fermentation shows inhibition of the growth of *Staphylococcus aureus* 209P, *Escherichia coli* and *Candida albicans*.

EXAMPLE 22

The procedure of Example 1 is followed substituting *Penicillium waksmanii* (ATCC 10516) for *Stilbella fimetaria*. Only the extract of the N-bromosuccinimide treated, acidified supernatant of the fermentation shows inhibition of the growth of *Staphylococcus aureus* 209P.

EXAMPLE 23

The procedure of Example 1 is followed substituting *Streptomyces chartreusis* (NRRL 2287) for *Stilbella fimetaria*. Only the extract of the N-bromosuccinimide treated, acidified supernatant of the fermentation shows inhibition of the growth of *Candida albicans*.

EXAMPLE 24

The procedure of Example 1 is followed substituting *Cercosporella acetosellae* (CBS) for *Stilbella fimetaria*. Only the extract of the N-bromosuccinimide treated, acidified supernatant of the fermentation shows inhibition of the growth of *Candida albicans*.

EXAMPLE 25

The procedure of Example 1 is followed substituting *Daldinia concentrica* (CBS) for *Stilbella fimetaria*. Only the extract of the N-bromosuccinimide treated, acidified supernatant of the fermentation shows inhibition of the growth of *Candida albicans*.

EXAMPLE 26

The procedure of Example 1 is followed substituting 12.5 mg. of N-bromoacetamide for the N-bromosuccinimide. Only the extract of the N-bromoacetamide treated, acidified supernatant of the fermentation shows inhibition of growth of *Candida albicans*.

EXAMPLE 27

The procedure of Example 1 is followed substituting *Aspergillus niger* for *Stilbella fimetaria*. The extract of the N-bromosuccinimide treated, acidified supernatant of the fermentation shows by the agar diffusion disc assay inhibition of the growth of *Staphylococcus aureus* 209P, *Escherichia coli*, *Candida albicans* and *Pseudomonas aeruginosa*. Purified extract shows significant inhibitory activity in the two-fold tube dilution assay against *Salmonella schottmuelleri*, *Escherichia coli*, *Staphylococcus aureus* 209P, *Pseudomonas aeruginosa*, *Proteus vulgaris*, *Candida albicans*, *Trichophyton mentagrophytes*, *Trichomonas vaginalis* and *Mycobacterium tuberculosis* (BCG).

EXAMPLE 28

The procedure of Example 6 is followed substituting 19.2 mg. of N-bromoacetamide for 12.5 mg. of N-bromosuccinimide. Only the extract of the N-bromoacetamide treated, acidified supernatant of the fermentation shows inhibition of growth of *Staphylococcus aureus* 209P, *Escherichia coli* and *Candida albicans*.

EXAMPLE 29

Halogenating enzyme is prepared by grinding 6 gm. of the acetone powder of *Caldariomyces fumago* (ATCC 16373) with 60 grams of acid washed sand and 150 ml. of distilled water for 5 minutes, then centrifuging. The clear supernatant resulting then constitutes the enzyme solution. To 3 ml. of this enzyme preparation are added 1 ml. distilled water, 2 ml. 0.3 M potassium phosphate solution (pH 3.0) and 5 ml. of the acidified fermentation supernatant (*Stilbella fimetaria*) as prepared in Example 1. A reaction mixture is similarly constituted substituting for the 5 ml. of acidified fermentation supernatant, 5 ml. of acidified unfermented medium. Additionally, control reactions are set up in which the components (enzyme, hydrogen peroxide, potassium bromide, acidified fermentation supernatant, and acidified unfermented medium) are individually omitted and substituted for by an equal volume of distilled water. The various reaction mixtures are agitated on a rotary shaker (280 cycles per minute) at 25° C. for 30 minutes, and are then extracted with 2 ml. of N-butanol. These extracts are tested for growth inhibitory activity as in Example 1. Only the extract of the reaction mixture containing all components in the presence of acidified fermentation supernatant shows inhibition of the growth of *Candida albicans*.

EXAMPLE 30

The procedure of Example 29 is followed substituting 5 ml. of an acidified fermentation supernatant of *Aspergillus clavatus* (ATCC 20198) for that of *Stilbella fimetaria*. Only the extract of the reaction mixture containing all components in the presence of acidified fermentation supernatant shows inhibition of the growth of *Candida albicans*.

What is claimed is:

1. A method for imparting antimicrobial activity to whole fermentation broths, crude filtrates or cell extracts which contain metabolic products having little or no intrinsic growth inhibitory activity against pathogenic microorganisms which comprises treating said fermentation broths, crude filtrates or cell extracts obtained by culturing microorganisms selected from the group consisting of *Streptomyces*, *Stilbella*, *Didymella*, *Aspergillus*, *Coniotherium*, *Gliocladium*, *Penicillium*, *Cercosporella* or *Daldina*, with a source of positive halogen and separating a product having appreciable antimicrobial activity therefrom, which product is substantially free of positive halogen source or other starting materials.

2. A process as in claim 1 wherein the microorganism is a species of *Streptomyces*.

3. A process as in claim 2 wherein the source of halogen is N-bromosuccinimide.

4. A process as in claim 1 wherein the source of halogen is a N-haloamide, N-haloimide or a halogenating enzyme system.

5. A process as in claim 1 wherein the source of halogen is N-bromoacetamide or N-bromosuccinimide or a chloroperoxidase enzyme system.

6. A method in accordance with claim 1 wherein the antimicrobially inactive crude broth, crude filtrate or cell extract is obtained by culturing the appropriate microorganism at a temperature within the range of from about 5 to about 60° C. under submerged aerobic conditions in an aqueous nutrient medium containing an assimilable carbohydrate and nitrogen source for about 2 to 5 days.

7. A method in accordance with claim 6 wherein the microorganism is grown in contact with, in or on a suitable nutrient medium in the presence of oxygen, said nutrient medium comprising a source of nitrogenous factors and an assimilable source of carbon and energy.

8. A method in accordance with claim 1 wherein the source of positive halogen is added to the whole broth, crude filtrate or cell extract at levels of about 0.1 to 50 mg. of halogen source per ml. of fermentation product, and the mixture is maintained at a temperature within the range of from about 20 to about 40° C. for a period ranging from about 1 to 60 minutes.

References Cited

Chemical Abstracts, vol. 37, 6300 (1943).

LIONEL M. SHAPIRO, Primary Examiner

R. J. WARDEN, Assistant Examiner

U.S. Cl. X.R.

195—81, 82; 424—123